March 20, 1951

C. F. ROBERTS ET AL 2,545,794

CULINARY IMPLEMENT

Filed Sept. 30, 1948

Clarence F. Roberts
Ernest Buckly
INVENTORS

BY *Clarence A. O'Brien
and Harvey B. Jacobson*
Attorneys

Patented Mar. 20, 1951

2,545,794

UNITED STATES PATENT OFFICE 2,545,794

CULINARY IMPLEMENT

Clarence F. Roberts and Ernest Buckly, Chicago, Ill.; said Buckly assignor of one-sixth to said Roberts Application September 30, 1948, Serial No. 52,035

3 Claims. (Cl. 294—7)

This invention relates to a culinary implement, and more particularly to a spatula or pancake turner.

The primary object is to avoid the spattering and splashing of hot grease when it is desired to turn an egg, pancake or the like being fried in a frying pan or similar vessel.

Another object is to support the article being fried so that it may be lifted from the hot grease and turned in mid-air, subsequently to be immersed in the hot grease in a position reverse to its initial position therein.

A still further object is to simplify and cheapen the construction of spatulas or pancake turners of the type to which this invention relates.

A still further object is to provide a simplified and cheaper structure than that disclosed in our co-pending application filed August 5, 1946, Serial No. 688,565, over which this invention is an improvement.

The above and other objects may be attained by employing this invention which embodies among its features a spring wire handle comprising a single piece of spring wire bent intermediate its ends to form a pair of spaced yielding arms adapted to be gripped in the hand of the user, a spatula blade secured to the free end of one of said arms, an inverted U-shaped guide fixed to the arm to which the aforesaid spatula blade is secured and housing the opposite arm of the handle, a lever pivoted in the guide adjacent the end nearest the spatula blade, a co-operating spatula blade fixed to the lever, the opposite end of the lever being movable in an arc within the guide, and a tongue on the lever entering a notch in the end of the arm which is housed within the shield for effecting a loose connection between the arm and the lever whereby when the arm is advanced toward the opposite arm, the lever will be swung about its pivot to lift the second mentioned spatula blade from its position over the first mentioned spatula blade.

Figure 1:
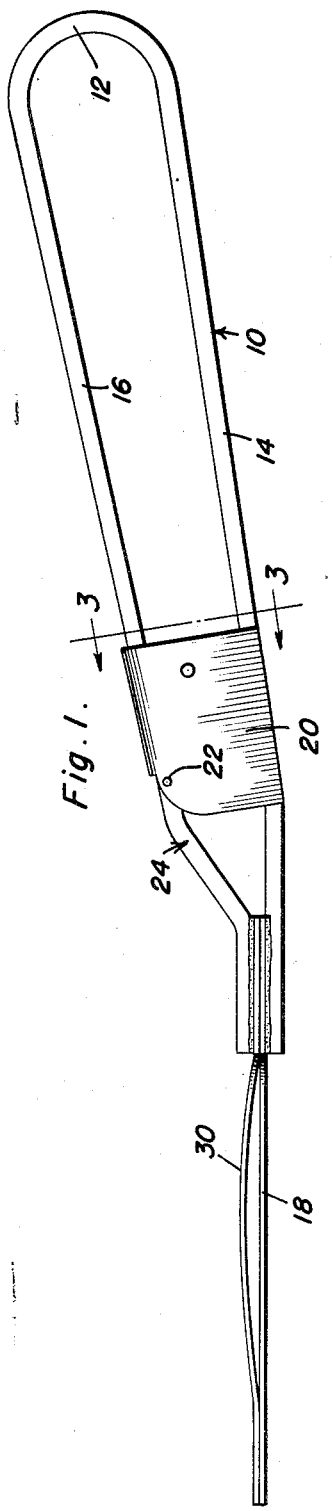
Figure 1 is a side view of a spatula embodying the features of this invention.

Referring to the drawings in detail the handle of the spatula designated generally 10 is formed from a piece of spring wire bent intermediate its ends as at 12 to form a longer spring arm 14 and a shorter spring arm 16. Fixed to the end of the arm 14 remote from the bend 12 is a spatula blade 18, and welded or otherwise rigidly secured to the arm 14 near the end carrying the spatula blade is an inverted U-shaped shield or guide 20 which extends upwardly from the arm 14, and lies substantially perpendicular to the plane of the spatula blade 18.

Pivotally supported on a pivot 22 adjacent the upward forward end of the shield or guide 20 is a lever designated generally 24, one end 26 of which moves through an arc within the shield or guide 20, while the opposite end projects beyond the forward end of the shield and is bent downwardly and outwardly as at 28, so that when the device is in food clamping position, the extension 28 lies substantially parallel with the forward end of the arm 14. A spatula blade 30 is welded or otherwise fixed to the extension 28 and is co-extensive with the spatula blade 18 so that the two form jaws between which the food to be handled is clamped or gripped.

The end of the arm 16 which moves within the shield or guide 20 is provided with a notch 32 which opens through the end of the arm and lies in a plane substantially parallel with the pivot 22. Formed on the end of the portion 26 of the lever 24 which oscillates within the shield or guide 20 is a tongue 34 which projects longitudinally therefrom and operates within the notch 32 in the end of the arm 16, so that when the arm 16 is advanced toward the arm 14, the lever 24 will be swung about the pivot 22 to lift the blade 30 from the blade 18. A suitable stop pin 36 extends transversely between the side members of the shield or guide 20 to limit the distance that the arm 16 may be moved toward the arm 14, so as to prevent the tongue from being completely extracted from the slot 32.

Figure 2:
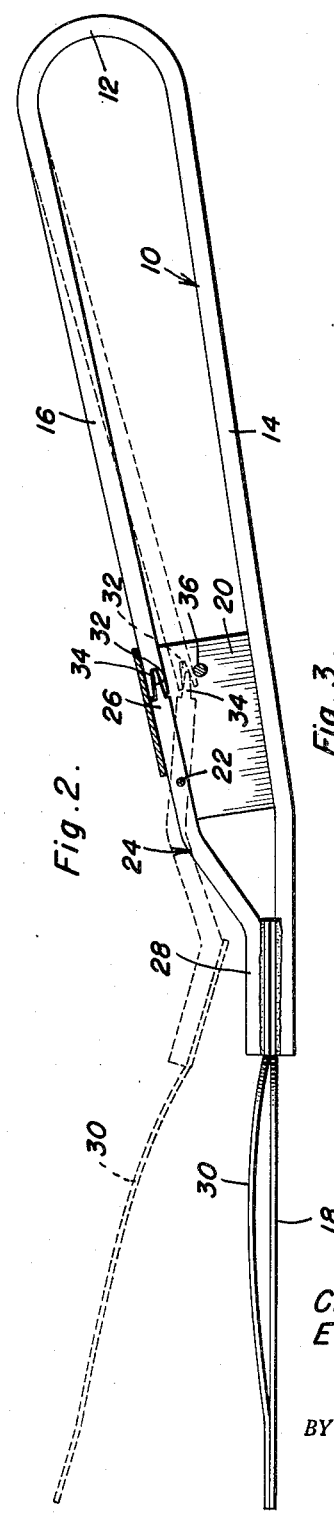
Figure 2 is a view similar to Figure 1 showing the near side of the shield or guide broken away.
Figure 3:
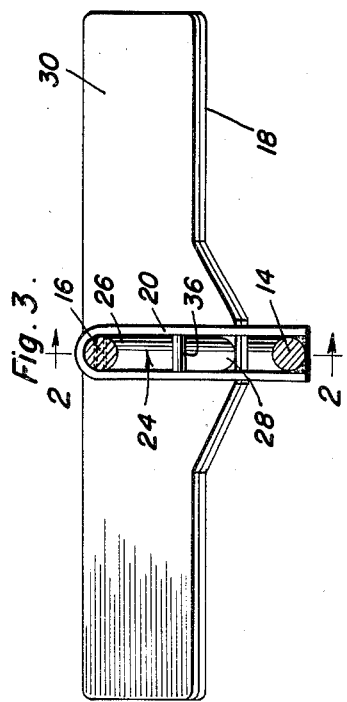
Figure 3 is a fragmentary enlarged sectional view taken substantially along the line 3—3 of Figure 1.

In use it will be understood that the material being handled is deposited in the frying pan or deep fat as the case may be, and when it is desired to turn the product, the spatula is employed by squeezing the handle 10 so as to advance the arm 16 toward the arm 14 and move the spatula blades 18 and 30 into substantially the position illustrated by the broken lines in Figure 2. The foodstuff may then be deposited on the blade 18 and upon releasing the pressure on the handle 10, the arm 16 will be sprung outwardly as indicated by the full lines in Figure 2 so as to advance the spatula blade 30 toward the blade 18 and grip the foodstuff between the spatula blades.

Obviously in this way the foodstuff may be handled to turn it and again deposit it in the pan or deep fat without causing the fat to splash or spatter, and the foodstuff may be released simply by exerting pressure again on the handle 10 to move the blades 18 and 30 away from one another.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A spatula comprising a rod of spring wire bent intermediate its ends to form a pair of spaced yielding arms movable toward and away from one another in a common plane, one of said arms being longer than the other arm, a spatula blade fixed to the longer arm adjacent its end remote from the bend in the rod, the shorter arm having a notch opening through its end and lying perpendicular to the plane of movement of the arms, an inverted U-shaped guide fixed to the longer arm adjacent the spatula blade and enclosing the notched end of the shorter arm, a lever pivoted intermediate its ends in the guide in spaced relation to the longer arm, a tongue on one end of the lever for entrance into the notch in the shorter arm and a spatula blade fixed to the lever adjacent its end remote from the tongue for cooperation with the first mentioned spatula blade in gripping foodstuffs between the blades.

2. A spatula comprising a rod of spring wire bent intermediate its ends to form a pair of spaced yielding arms movable toward and away from one another in a common plane, one of said arms being longer than the other arm, a spatula blade fixed to the longer arm adjacent its end remote from the bend in the rod, the shorter arm having a notch opening through its end and lying perpendicular to the plane of movement of the arms, an inverted U-shaped guide fixed to the longer arm adjacent the spatula blade and enclosing the notched end of the shorter arm, a lever pivoted intermediate its ends in the U-shaped guide for movement in the common plane, a tongue on one end of the lever for entrance into the notch in the shorter arm, a spatula blade fixed to the shorter arm adjacent its end remote from the tongue for cooperation with the first mentioned spatula blade in gripping foodstuffs between the blades, and said spatula blades being co-extensive in area.

3. The combination of claim 1 and a stop carried by said guide adapted to engage the notched end of the shorter arm to limit the downward movement of the shorter arm.

CLARENCE F. ROBERTS.
ERNEST BUCKLY.

REFERENCES CITED

The following references are of record in the file of this patent:

UNITED STATES PATENTS

| Number | Name | Date |
| --- | --- | --- |
| 1,828,187 | Holland | Oct. 20, 1931 |

FOREIGN PATENTS

| Number | Country | Date |
| --- | --- | --- |
| 20,202 | Great Britain | Sept. 20, 1904 |
| 26,097 | Great Britain | Nov. 27, 1902 |